United States Patent [19]
Kuczynski

[11] Patent Number: 5,872,158
[45] Date of Patent: Feb. 16, 1999

[54] CLEAVABLE DIACRYLATE FOR REMOVABLE ACRYLATE COMPOSITIONS

[75] Inventor: Joseph Paul Kuczynski, Rochester, Minn.

[73] Assignee: International Business Machines Corporation, Armonk, N.Y.

[21] Appl. No.: 874,113

[22] Filed: Jun. 12, 1997

[51] Int. Cl.$^6$ ........................................ C08F 2/46
[52] U.S. Cl. .................... 522/182; 528/246; 525/154; 525/472; 525/539; 522/79; 522/114; 522/183; 522/121; 524/1; 524/155; 524/165; 524/167; 524/284; 524/366; 524/539
[58] Field of Search ................ 528/246; 525/154, 525/472, 539; 522/79, 114, 121, 182, 183; 524/1, 155, 165, 167, 284, 366, 539

[56] References Cited

U.S. PATENT DOCUMENTS

| | | | |
|---|---|---|---|
| 4,205,018 | 5/1980 | Nagasawa et al. | 525/404 |
| 4,282,301 | 8/1981 | Ohta | 430/175 |
| 4,289,675 | 9/1981 | Krajewski | 524/535 |
| 4,340,453 | 7/1982 | Noomen | 204/159.15 |
| 4,440,850 | 4/1984 | Paul et al. | 430/325 |
| 4,650,743 | 3/1987 | Galloway | 430/278 |
| 5,114,832 | 5/1992 | Zertani et al. | 430/285 |
| 5,171,655 | 12/1992 | Aoshima | 430/138 |
| 5,242,779 | 9/1993 | Mueller-Hess et al. | 430/175 |
| 5,277,739 | 1/1994 | Muller et al. | 156/330.9 |
| 5,278,199 | 1/1994 | Ohkawa et al. | . |
| 5,360,873 | 11/1994 | Ohkawa et al. | . |
| 5,459,010 | 10/1995 | Shimizu et al. | 430/175 |
| 5,459,174 | 10/1995 | Mererill et al. | . |
| 5,512,613 | 4/1996 | Afzali-Ardakani et al. | . |

OTHER PUBLICATIONS

Chang, C. et al., "A New Liquid Photoinitiator for UV Curing Applications," *Ciba–Geigy Corporation, RadTech '94*, May 1–4, 1994, pp. 1–9.

Leopold, D. et al., "EPR Studies on the Photofragmentation of 2,2–Dialkyl–2–alkylamino–acetophenones," *J. Chem. Soc. Perkin Trans.* 2, 1992, pp. 513–518.

Meskens, Frans A., "Methods for the Preparation of Acetals* from Alcohols or Oxiranes and Carbonyl Compounds," *Synthesis*, 1981, pp. 501–522.

Sandler et al., "Organic Functional Group Preparations," *Academic Press, New York*, 1972, pp. 4–17 and 34–42.

IBM Technical Disclosure Bulletin, "Novel Photoinitiators for Free Radical Polymerization," *IBM Corp.*, vol. 33, No. 2, Jul. 1990, p. 415.

"Irgacure® 184, Photoinitiator for Ultraviolet Curing of Coatings," *Ciba–Geigy Corporation*, 1994, pp. 1–10.

"Quantacure CPTX, the way forward for pigmented UV systems," *International Bio–Synthetics*, pp. 1–4 (undated).

"Quantacure Photochemicals," *International Bio–Synthetics*, pp. 1–6 (undated).

"Sartomer® Monomer/Oligomer Product Line Catalog," *Sartomer Company*, 1987, pp. 1–20.

"CGI 369—Developmental Photoinitiator from CIBA–GEIGY for Free Radical Polymerization", *Ciba–Geigy Corporation*, pp. 1–13 (undated).

*Primary Examiner*—Samuel A. Acquah
*Attorney, Agent, or Firm*—John J. Gresens; Matthew J. Bussan

[57] ABSTRACT

The claimed invention is an uncured thermosetting composition which is capable of curing upon exposure to actinic radiation, said composition comprising an acetal diacrylate of the formula:

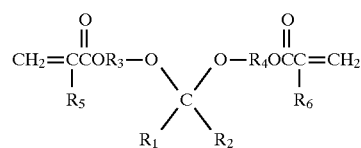

wherein $R_1$ and $R_2$ are individually hydrogen, $C_{1-6}$ alkyl, aryl, or substituted aryl; $R_3$ and $R_4$ are individually $C_{1-6}$ alkyl, aryl, substituted alkyl, or aryl alkyl; and $R_5$ and $R_6$ are individually hydrogen or $C_{1-6}$ alkyl; and a free radical curing agent.

38 Claims, 1 Drawing Sheet bis (2-Hydroxyethyl methacrylate) acetal bis (2-Hydroxyethyl methacrylate) acetal bis (Hydroxypropyl methacrylate) acetal bis (2-Hydroxyethyl acrylate) acetal bis (Hydroxypropyl acrylate) acetal

CLEAVABLE DIACRYLATE FOR REMOVABLE ACRYLATE COMPOSITIONS

FIELD OF THE INVENTION

The invention relates generally to acrylate-based reworkable encapsulants for integrated circuit assemblies. More specifically, the invention relates to photosensitive reworkable encapsulants for integrated circuits which comprise acetal diacrylates and which are curable with actinic radiation.

BACKGROUND OF THE INVENTION

Thermoset compositions such as acrylate resins are important in the manufacture and processing of circuit assemblies. The diverse number of applications include coatings, adhesives, structural materials, electrical insulation, as well as encapsulation and sealing. The attributes of acrylates include the combination of processability prior to curing with outstanding properties after curing. Acrylates generally have a low viscosity prior to curing, even in the absence of solvents. After curing, acrylates exhibit toughness, adhesion, and solvent resistance.

The attributes of acrylates also include intractability after curing. This intractability is the result of a curing reaction to convert a low molecular weight precursor to a polymer network of essentially infinite molecular weight. These attributes make acrylates ideal for use in the construction of circuit assemblies such as single-sided and double-sided circuits, as well as other types of surface mount technology including chip carriers, multichip modules and multilayer boards.

Ohkawa et al, U.S. Pat. Nos. 5,278,199 and 5,360,873 disclose acrylate containing pressure sensitive adhesives which may be cured using actinic radiation to form a semiconductor element.

Merrill et al, U.S. Pat. No. 5,459,174 discloses a styrene-isoolefin copolymer which is functionalized with an acrylate and curable with actinic radiation.

However, once cured, these compositions form non-reworkable and intractable masses. The intractability of thermosets has become more of a liability because of concerns about the longitivity of circuit assemblies in the environments of use. Also, many manufacturers are taking responsibility for disposal or recycling of their products. Manufacturers may even be required to be responsible for disposal or recycling of products through government regulation.

Intractable thermosets are also not compatible with the concept of disassembly for purposes of disposal, repair, or recycling, whether the thermosets are used as structural components, adhesives, or encapsulants. If, however, the thermoset itself is designed for disassembly on the molecular scale, it is possible that the many advantages of the thermosets can be retained without the disadvantages of intractability. As demand increases for recyclable products, diacrylate materials which allow for reworkability may well offer a means of maintaining the utility of thermoset materials which offer repair, replacement, recovery, or recycling.

As a result, there is a need for photosensitive encapsulants which provide the requisite curing properties and physical stability once cured which are at the same time reworkable so as to allow for the recovery of various thermosetting systems.

SUMMARY OF THE INVENTION

In accordance with a first aspect of the invention, there is provided an uncured thermosetting composition which is capable of curing upon exposure to actinic radiation. The composition comprises an acetal diacrylate of the formula:

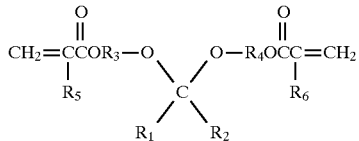

wherein $R_1$ and $R_2$ are individually hydrogen, $C_{1-6}$ alkyl, aryl, or substituted aryl; $R_3$ and $R_4$ are individually $C_{1-6}$ alkyl, aryl, substituted alkyl, or aryl alkyl; and $R_5$ and $R_6$ are individually hydrogen or $C_{1-6}$ alkyl; and a free radical curing agent. The composition also includes a free radical curing agent, and optionally a second acrylic resin, and an organic or inorganic filler.

In accordance with a further aspect of the invention, there is provided a cured encapsulant resin which is the reaction product of the disclosed acetal diacrylate composition.

In accordance with an additional aspect of the invention there is provided a method of recovering a cured thermosetting encapsulant resin comprising the reaction product of an acetal diacrylate, a photo-initiator and an organic filler. The cured encapsulant resin is soluble in a dilute acid solution thereby allowing recovery. The method includes the steps of subjecting the encapsulant resin to an acidic solvent for a period of time adequate to substantially dissolve the resin.

Acrylate compositions are thermosetting materials which are extremely difficult, if not impossible, to remove following cure. To circumvent this problem, the acrylate monomer of the invention is curable using actinic radiation and incorporates a cleavable acetal linkage which renders the cured diacrylate formulations soluble in a suitable solvent blend. Soluble acrylate encapsulants are advantageous for many applications, such as reinforcing solder joints and wire bonds in microelectronic devices. Removal of the acrylate permits replacement of defective chips on circuit assemblies without having to discard the assembly to which the chip is bonded.

In a more preferred mode, the claimed invention uses a free radical curing agent to crosslink an acetal diacrylate. The cured acrylate is soluble in dilute acidic media and reworkable which is highly desirable and cost effective. The claimed acrylate formulations crosslink rather than hydrolyze in the presence of the free radical curing agent. The claimed curable acetal diacrylate formulations crosslink upon exposure to actinic radiation. Yet these compositions remain soluble in acidic media, thereby providing a composition which has the properties of a thermoset while remaining reworkable.

DETAILED DESCRIPTION OF THE INVENTION

The invention is an uncured thermosetting resin, cured encapsulant, and method of recovering cured encapsulant compositions.

3

THE ENCAPSULANT

A first aspect of the invention is a thermosetting composition which is capable of curing upon exposure to actinic radiation. The composition of the invention comprises an acetal diacrylate of the formula:

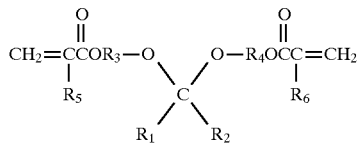

wherein $R_1$ and $R_2$ are individually hydrogen, $C_{1-6}$ alkyl, aryl, or substituted aryl; $R_3$ and $R_4$ are individually $C_{1-6}$ alkyl, aryl, substituted alkyl, or aryl alkyl; and $R_5$ and $R_6$ are individually hydrogen or $C_{1-6}$ alkyl. Generally, this acrylate may be cured with a free radical curing agent.

The composition of the invention comprises a family of acrylate compositions which may be cured with actinic radiation and then are removable in certain acidic solvents because of the cleavable acetal link connecting the acrylate groups. The composition of the invention provides a recoverable encapsulant with a glass transition temperature (Tg) which allows use of the system in circuit assemblies.

The uncured thermosetting composition which is capable of curing upon exposure to actinic radiation, comprises an acetal diacrylate. The composition of the invention also includes a free radical curing agent, and an organic filler. Optionally, the invention may also include a second acrylic resin.

A. The Acetal Diacrylate

The invention is based on the recognition that certain acrylate resins may be cured with actinic radiation by using free radical curing agents, preferably an alkyl amino acetophenone curing agent, and then solubilized when subjected to an acid-based solvent for reworking.

Figure 1:
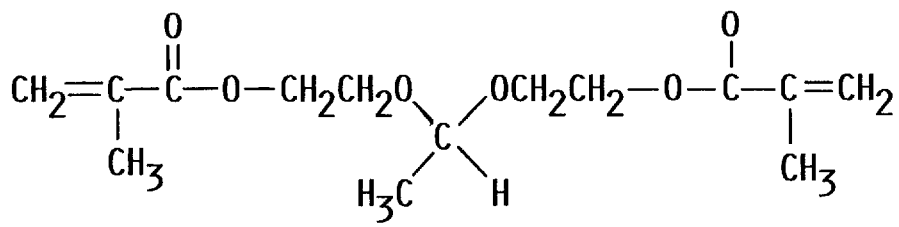
FIG. 1 is a chemical formula for bis (2-Hydroxyethyl methacrylate)acetal.
Figure 2:
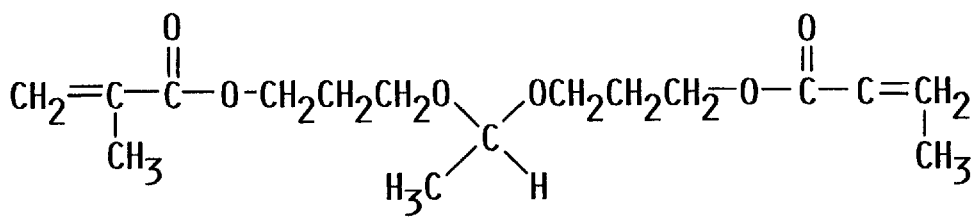
FIG. 2 is a chemical formula for bis (Hydroxypropyl methacrylate)acetal.
Figure 3:
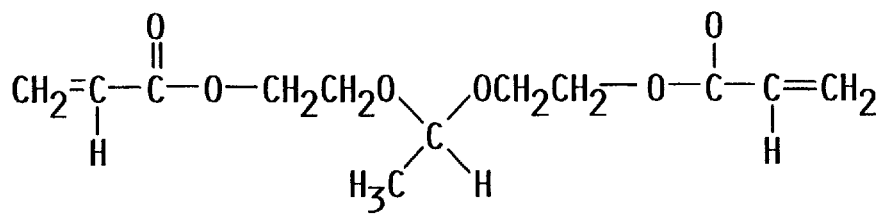
FIG. 3 is a chemical formula for bis (2-Hydroxyethyl acrylate)acetal.
Figure 4:
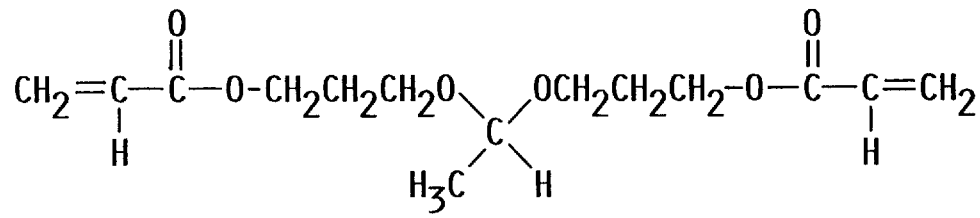
FIG. 4 is a chemical formula for bis (Hydroxypropyl acrylate)acetal.

Representative acrylate compounds may be seen in FIG. 1. The appropriate acrylate preferably has: (1) a chemical structure which is stable under conditions in which the cured matrix would normally be exposed; (2) a chemical structure which is sufficiently stable as a thermoset in the intended application; (3) a chemical structure which allows dissolution and reworkability under specific conditions; (4) a chemical structure which reacts as intended during the curing of the acrylate to form a polymeric matrix; and (5) a practical synthesis making the acrylate readily available.

Generally, the acetal diacrylate of the invention has the formula:

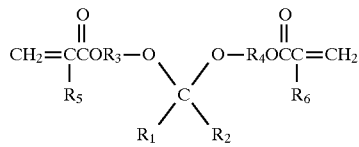

wherein $R_1$ and $R_2$ are individually hydrogen, $C_{1-6}$ alkyl, aryl, or substituted aryl; $R_3$ and $R_4$ are individually $C_{1-6}$ alkyl, aryl, substituted alkyl, or aryl alkyl; and $R_5$ and $R_6$ are individually hydrogen or $C_{1-6}$ alkyl.

More specifically, $R_1$ and $R_2$ may be hydrogen, aryl, substituted aryl, or a $C_{1-6}$ alkyl including branched or linear methyl, ethyl, propyl, butyl, pentyl, or hexyl any of which may be saturated or unsaturated. $R_3$ and $R_4$ may be $C_{1-6}$ alkyl as defined for $R_1$ and $R_2$. Additionally, $R_3$ and $R_4$ may be aryl such as benyl or tolyl; alkyl aryl such as any $C_{1-6}$ defined above with benzyl or tolyl; or a substituted alkyl such as alkoxy like methoxy, ethoxy, propoxy, and the like. $R_5$ and $R_6$ may individually be hydrogen or a $C_{1-6}$ alkyl, as defined above.

The ketal and acetal groups have been identified as candidates meeting the above criteria. For the purposes of this invention, the term "acetal" refers to the 1,1-dialkoxy group as depicted in Formula 1, above, where $R_1$ and $R_2$ can be alkyl, aryl, aryl alkyl or hydrogen. The general use of the term "acetal" includes ketals where $R_1$ and $R_2$ are equivalent to alkyl, aryl, or aryl alkyl; acetals where $R_1$ is equivalent to alkyl, aryl or aryl alkyl and where $R_2$ is H and formulas where $R_1$ and $R_2$ are H.

As disclosed in March, J. *Advanced Organic Chemistry* (3d ed.), Wiley Interscience 329–331 (1985), the known organic chemistry of ketals and acetals indicates that they are exceedingly stable to hydrolysis in the absence of acids, but break down readily in acid, even weak acids. Ketals and acetals are not subject to reactions similar to those of acrylate groups, and thus an acetal or a ketal link should not be affected by the curing reaction of the acrylate matrix.

Acetals can be hydrolyzed in acidic aqueous solutions, but they are also susceptible to transetherification under acidic conditions. Because the network fragments are organic solvent-soluble and not water-soluble, it has been found that the best preferred solvents for dissolution of the cleavable networks are those containing an alcohol and some organic acid such as methanesulfonic acid or p-toluene sulfonic acid. It then becomes possible to use an alcohol as both the solvent and the reactant which eliminates the necessity of adding water.

Control of the degradability/stability of the compositions with respect to ambient moisture is achieved, pursuant to the invention, by using variables in the formulation. The structure of the cleavable link can be varied to adjust the stability of the link to hydrolysis. The rate of hydrolysis of acetals is affected by the substituents on the central carbon of the acetal.

Considering for illustration purposes only methyl and hydrogen substituents, the formal, with two hydrogens on the central carbon is slowest to hydrolyze; the acetal, with one hydrogen and one methyl, hydrolyzes considerably more easily; and the ketal, with two methyls, hydrolyzes the fastest of the three. By choosing diacrylates linked by formal, acetal, and ketal groups or by choosing some mixture of these; the formulator can adjust the degradability of the resulting thermoset network to match the requirements of his application.

The ketal/acetal diacrylates structure is shown in Formula I, in which $R_1$ and $R_2$ can be any combination of hydrogen, methyl, ethyl, propyl, iso-propyl, butyl, iso-butyl, other alkyl, phenyl, benzyl, substituted phenyl or substituted benzyl. Substituents on the phenyl or benzyl can be at one or more of the available aromatic positions and can be a halogen such as chlorine, bromine, or fluorine, a nitro group, any alkyl group such as methyl, ethyl, or isopropyl, an alkoxy group such as methoxy, ethoxy, or isopropoxy, an acyl such as acetyl or benzoyl, or any of the family of aromatic substituent groups well known in organic chemistry. As can be seen by the structure of Formula I, the acrylate may be any diacrylate in which the two acrylate groups are connected by an acetal or ketal. The preferred diacrylate structure is the product of a reaction between acetaldehyde and 2-hydroxy ethylmethacrylate to provide a compound more commonly known as acetal diacrylate wherein $R_1$ is H, $R_2$ is $CH_3$, $R_3$ and $R_4$ are each ethyl, and $R_5$ and $R_6$ are each methyl.

Acrylate-based formulations that are either thermally or UV cured to form a thermoset, cross-linked network are known to those of skill in the art. Cured formulations are virtually impossible to remove and, therefore, impractical to rework. By incorporating a cleavable, difunctional acrylate monomer into the formulation, material compositions that are soluble in a suitable solvent blend can be devised. The concept involves synthesis of an acetal diacrylate which is soluble in an appropriate solvent containing a dilute, organic acid.

One method of synthesizing acetal diacrylate was accomplished via a procedure outlined in "Organic Functional Group Preparations," Sandler and Karo, Academic Press, 1972, at page 11. In this process, anhydrous $CaCl_2$, and 2-hydroxyethyl methacrylate are combined and the mixture shaken. The mixture is chilled and then added to acetaldehyde.

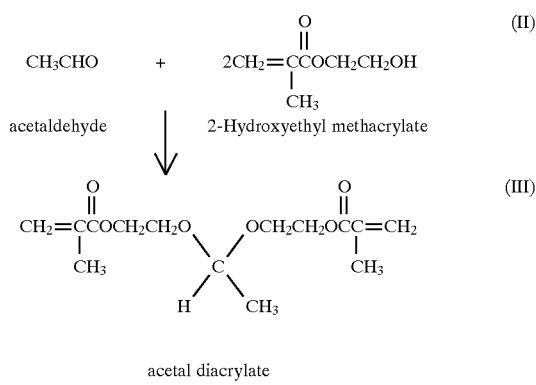

acetal diacrylate

The reaction generally proceeds with the optional application of physical agitation and heat along the synthesis outlined above.

Generally, the concentration of acetal diacrylate may range from about 5 wt % to 99 wt %, preferably 10 wt % to 50 wt %, and more preferably from 15 wt % to 25 wt % in the uncured encapsulant composition.

B. THE Second Acrylic Resin

The composition of the invention may also comprise a second acrylic resin.

The second acrylic resin generally comprises an acrylate which functions to either reduce crosslink density and thereby enhance reworkability, or modify the glass transition temperature of the cured resin. Representative acrylic resins include monofunctional acrylic resins, difunctional acrylates, and multifunctional acrylates, including isobornylmethacrylate, diethylene glycol diacrylate, and trimethylolpropane trimethacrylate.

Preferred resins include monofunctional acrylic resins such as methyl methacrylate, isobornyl methacrylate, and cyclohexyl methacrylate all available from Sartomer.

Generally, the concentration of this second polymeric acrylic resin may range from about 0 wt % to 50 wt %, preferably from about 10 wt % to 40 wt %, and more preferably from about 15 wt % to 30 wt % in the uncured system. Further, when present, the ratio of acetal diacrylate to second acrylate functional resin preferably ranges from about 1:5 to 1:1.

C. The Curing Agent

Generally, the composition of the invention also comprises a free radical curing agent. The free radical curing agent works to cure and polymerize the acrylate compounds of the invention through the application of actinic radiation such as ultraviolet energy. Representative curing agents include photoinitiators such as benzoin ethers, acetophenones, acyl phosphine oxides, benzophenones and 3-ketocoumarins, among others. Also useful are thermal initiators such as peroxides and azobisisobutyronitrile, among others.

Photoinitiators generally react when exposed to light radiation. For example, benzoin ethers undergo photolysis to generate free radicals as illustrated below:

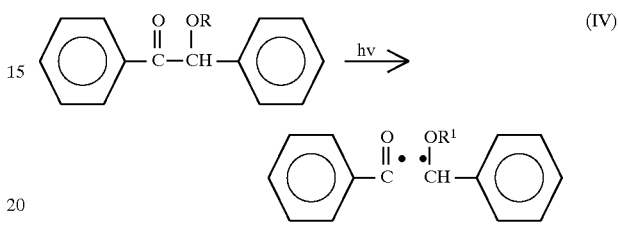

The substituent, $R^1$, on the ether oxygen can be any typical alkyl, substituted alkyl, aryl, alkoxy, etc. Representative examples include: benzoin, ($R^1$=H); benzoin ethyl ether, ($R^1$=$C_2H_5$); benzoin isobutyl ether, ($R^1$=$CH_2CH(CH_3)_2$); benzoin methyl ether, ($R^1$=$CH_3$). Para substituted phenyl derivatives also exist, such as 4,4'-dimethoxybenzoin.

Acetophenone and its derivatives are another class of free radical-generating photoinitiators. These include α, α-dimethoxy-α-phenyl acetophenone (DMPA) and α, α-diethoxy acetophenone (DEAP).

Both DMPA and DEAP undergo intramolecular bond cleavage to generate $C_6H_5CO$ as a primary radical species. Other acetophenone derivatives include α-hydroxy-α, α-dialkyl acetophenones. Upon photolysis, $C_6H_5CO$ and C(OH)RR' are generated. Again both R and R' may be alkyl, substituted alkyl, alkoxy, as defined above. Additionally, R and R' may form a cyclic bridge as shown below:

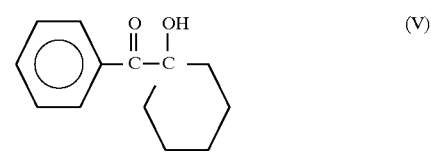

Acylphosphine oxides are another class of photoinitiators such as those disclosed in U.S. Pat. No. 4,265,723 which is incorporated herein by reference. A representative member of this class of compounds is:

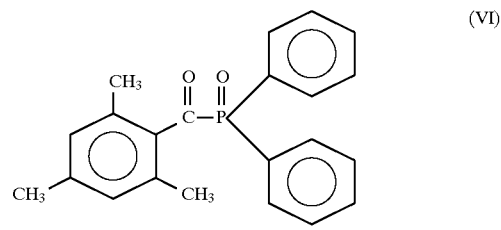

Acylphosphine oxides cleave along the carbon-phosphorous bond. The phosphorous-centered radical is claimed to react with olefinic species.

Photoinitiation through intermolecular hydrogen-abstraction is the mode by which benzophenone and analogous compounds initiate free radical polymerization in acrylate formulations. Generic structures include:

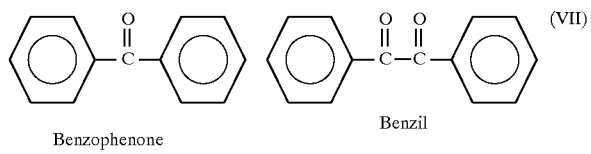

Benzophenone    Benzil    (VII)

These compounds typically undergo a bimolecular reaction with hydrogen-donors, typically tertiary amines such as Micheler's ketone. Benzil, camphorquinone, and 9,10-phenanthrene quinone also undergo this type of reactive chemistry.

Ketocommarins, including 3-ketocommarins, such as those disclosed in U.S. Pat. 4,289,844, incorporated herein by reference, are also useful as photoinitiators of free radical polymerization.

Free radical curing agents including thermal initiators are also useful in the invention. Representative thermal initiators include azonitriles such as azobisisobutyronitrile; azo compounds such as phenyl-azo-triphenylmethane; alkyl peroxide such as t-butyl peroxide; acyl peroxides such as benzoyl peroxide; hydroperoxides and ketone peroxides such as cumene hydroperoxide; peresters and peroxy carbonates such as t-butyl peracetate; as well as benzenesulfonyl azide, among others.

Organic free radical thermal initiators may be found in *Polymer Handbook*, Second Edition, Brandrup and Immergut, eds., J. Wiley and Sons, N.Y., 1975, Chap. II.

Generally, photoinitiators useful in the invention include those found in *UV Curing: Science and Technology*, Vol I, S. Peter Pappas, ed., Technology Marketing Corp., Norwalk, Conn., Chap 1, 1978, and references therein; and *U.V. Curing: Science and Technology*, Vol I, S. Peter Pappas, ed., Technology Marketing Corp., Norwalk, Conn., Chap 1, 1985, and references therein.

The concentration of this constituent in the invention may range from about 0.1 to 5 wt %, preferably from about 0.5 to 3 wt %, and most preferably about 1 to 2 wt % of the uncured system. Preferably, the initiator is an alkylaminoacetophenone such as Irgacure 369 from Ciba Geigy.

D. Fillers

The composition of the invention may also comprise an organic or inorganic filler.

As indicated above, the polymeric filler can be selected from any number of polymer classes. From a practical standpoint, the filler should be easily dispersible (for example, a powder) into the monomer composition and possess a Tg in excess of 80° C. Additionally, the filler must be soluble in the rework solvent. The filler serves to fortify the formulation (i.e., it should not lower the Tg below the glass transition temperature of the monomer homopolymer) and becomes entangled in the cross linked acrylate.

Encapsulants may be filled with an organic powder to reduce the coefficient of thermal expansion.

Organic fillers which may be used in the invention include polyacrylates such as polymethylacrylate, and polyethylacrylate; polyalkyl or arylmethacrylates such as polymethylmethacrylate, polycyclohexylmethacrylate, polyisopropylmethacrylate; styrenes including polystyrene, poly(a-methyl styrene), poly(t-butylstyrene), and poly (vinyltoluene), among others; nylons such as Nylon 6(or poly(caprolactam)), Nylon 6/6 (or poly(hexamethylene apidamide)), Nylon 6/12 (or poly(hexamethylene dodecanediamide)), among others; polycarbonates; phenoxy resins such as PKHH, PKHC, PKHJ, of the formula [O—$C_6H_4$C($CH_3$)($CH_3$)$C_6H_4$O$CH_2$CH(OH)($CH_2$)]n wherein n may range from 38 to greater than 60 (sold by Union Carbide)among others; polyvinyl alcohol; ethylene vinyl acetate; rubbers such as acrylonitride-butadiene-styrene copolymers, and acrylonitride-butadience-styrene/polycarbonate mixtures, among others; and polyesters such as poly(ethylene terephthalate), and poly (butyleneterephthalate), among others. These fillers may also be used in any mixture or combination which is compatible in the composition of the claimed invention.

For microelectronic applications, the preferred organic fillers are polyacrylates such as poly(methylmethacrylate and polyalkyl or aryl methacrylates such as poly (cyclohexylmethacrylate). Generally, the amount of organic filler may vary but is preferred in the range of 0 to 50 wt %, and preferably in the range of 10 to 40 wt % on a weight basis, and more preferably about 15 to 35 wt % of the uncured system.

The composition of the invention may also comprise an inorganic filler. Encapsulants may be filled with an inorganic powder to reduce the coefficient of thermal expansion. The optional inorganic filler can be any of the powdered solids known in the art, such as alumina, silica, zinc oxide, talc, etc. For microelectronic applications, the preferred filler is a highly purified form of silica with particle size of 25 microns or less. Generally, the amount of filler may vary but is preferred in the range of 0 to 75 wt %, and preferably in the range of 50–70 wt % of the uncured system.

A summary of constituent concentrations in the uncured composition may be found in Table 1 below.

TABLE 1

| CONSTITUENT | USEFUL | PREFERRED | MORE PREFERRED |
|---|---|---|---|
| Acetal Diacrylate | 5–99.9 | 15–50 | 15–35 |
| Second Acrylic Resin | 0–50 | 10–40 | 15–35 |
| Curing Agent | 0.1–5 | 0.5–3 | 1–2 |
| Organic Filler | 0–75 | 25–70 | 30–50 |
| Inorganic Filler | 0–75 | 25–70 | 30–50 |
| Tg (°C.) | +75° C. | +90° C. | +100° C. |

APPLICATION AND CURING

The ketal and acetal diacrylate of the invention are synthesized and then preferably mixed with an initiator, and, optionally an organic filler. Upon irradiation, the initiator undergoes homolytic bond cleavage from the excited state to yield a free radical pair.

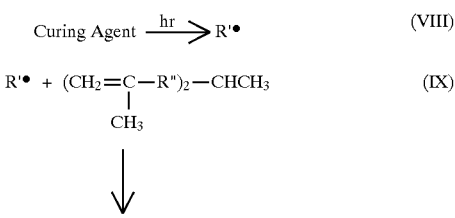

$$\text{Curing Agent} \xrightarrow{hr} R'\bullet \qquad (VIII)$$

$$R'\bullet + (CH_2=\underset{\underset{CH_3}{|}}{C}-R'')_2-CHCH_3 \qquad (IX)$$

$$\downarrow$$

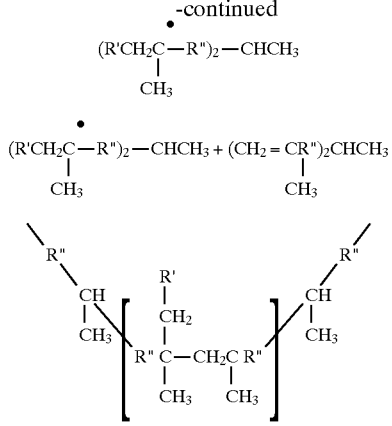

The acrylate formulations may be cured by the application of actinic radiation with or without heat. Generally, the radiation has a wavelength greater than about 200 nm, and preferably from about 250 nm to 400 nm and is used over a cure time of ranging from about 10 to 30 seconds with an exposure of about 3 to 12 J/cm². If a postexpose bake is used, the composition is heated at 90°–200° C. for one to six hours, preferably 100°–150° C. for about two hours to form a hard tack-free solid. The preferred curing schedule includes exposure to actinic radiation (365 nm) for a dose of 6–8 J/Cm².

RECOVERY

After curing, the cleavable diacrylate formulations can be dissolved by hydrolysis or transetherification of the cleavable link, which is an acetal group connecting two acrylate groups. Acetals and ketals are generally easily cleaved in aqueous acid, but in order to dissolve the matrix an organic solvent is also needed. Many mixtures of organic solvents, acid or acids, and water can be used. For the purposes of this invention, suitable acids include organic acids such as acetic acid, propanoic acid, chloroacetic acid, benzoic acid, and the like; sulfonic acids such as benzene sulfonic acid, p-toluene sulfonic acid, methane sulfonic acid, and the like; inorganic acids such as sulfuric acid, phosphoric acid, hydrochloric acid, and the like. These structures are exemplary only and are disclosed to illustrate the types of solvents and acids to be used. The preferred acids are methane sulfonic acid, and p-toluene sulfonic acid.

The temperature of the solvent mixture can be 25° C. or above, but for most rapid dissolution, the solvents should be heated to boiling or near boiling. When used, mixtures of methylene chloride, 1-butanol, ethylene glycol, xylene, and water are particularly effective in dissolving the cured formulations based on acetal diacrylate.

Other suitable solvent mixtures include a combination of gamma butyrolactone, water, and phosphoric acid and a combination of butanol, acetic acid, and water. Acetals and ketals are also susceptible to transetherification under acidic conditions.

Thus, it becomes possible to use an alcohol as both the solvent and the reactant, removing the necessity of adding water to the system thereby reducing the likelihood of corrosion of metallic components of the device.

For example, a mixture of ethanol, ethylene glycol, toluene and an organic acid such as benzene sulfonic acid, para-toluene sulfonic acid, or methane sulfonic acid can be used to dissolve the cured acrylate base of the acetal diacrylate compositions. Trans-etherification using a primary alcohol such as ethanol and an organic acid such as a methane sulfonic acid is faster than hydrolysis in aqueous acid. An even faster dissolution rate was obtained by the incorporation of a portion of a less polar organic solvent such as xylene or benzyl alcohol or by the use of trifluoroethanol instead of ethanol.

One solvent system used in accordance with the invention comprises primary and secondary alcohols such as ethanol, methanol, butanol and mixtures thereof. Di-functional alcohols such as glycols may be used to impart a higher boiling point to the solvent blend.

Less polar organic solvents may also be used such as benzyl alcohol, xylene, and toluene. One exemplary solvent system comprises a 1:1:1 wt % ratio of ethylene glycol, 1-butanol and xylene. Another system which is less corrosive comprises about 10 to 50 vol %, preferably 25 to 35 volt primary alcohol or diol and about 50 to 75 vol %, preferably 60 to 70 vol % less polar organic solvent, i.e., benzyl alcohol, xylene, toluene, or mixtures thereof.

The solvent system may also comprise an acid source such as an organic acid as exemplified by methane sulfonic acid, p-toluene sulfonic acid, or trifluoro methane sulfonic acid present in a concentration ranging from 0.2–0.6M, and preferably 0.25 to 0.35M. Additionally, about 30 parts of ethylene glycol is used in the solvent. Optionally, the solvent includes a surfactant and/or a corrosion inhibitor.

WORKING EXAMPLES

The following examples are intended to provide a non-limiting illustration of the invention.

Example 1

Synthesis of the acetal diacrylate was accomplished by mixing 0.8767 g (8 mmole) anhydrous $CaCl_2$) with 13.0170 g (0.10 mole) of 2-hydroxyethyl methacrylate. The mixture was shaken, then placed in a −40° C. freezer for 30 min. prior to the addition of 2.227 g (0.05 mole) of cold (<0C) acetaldehyde. The reaction vessel was sealed and crimped, vigorously shaken for 10 min., then permitted to sit at ambient for 24 hrs. with intermittent shaking. At the end of the 24-hr. period, a homogeneous organic phase was evident. The organic phase was decanted from the $CaCl_2$ into a separatory funnel. Upon addition of 20 ml of DI water, two distinct phases formed. The organic phase was washed three times with 20–25 ml of deionized water, separated from the aqueous phase, and dried over 0.1238 g of anhydrous $K_2CO_3$. Instrumental analysis confirmed the structure as being consistent with the acetal.

Example 2

To demonstrate the utility of the acetal diacrylate, two preliminary formulations were prepared.

EXAMPLE 2A

| Resin | Weight |
| --- | --- |
| Sartomer 351 (trimethylolpropane triacrylate) | 0.3748 g |
| Irgacure 907[1] | 0.0075 g |

EXAMPLE 2B

| Resin | Weight |
| --- | --- |
| Acetal diacrylate | 0.3711 g |
| Irgacure 907[1] | 0.0076 g |

[1] 2-methyl-1-(4-(methylithlthio)phenyl)-2-(4-morpholinyl)-1-propanone

The formulations of EXAMPLE 2A AND 2B were exposed to 12.7 J/cm² of 365 nm light whereupon hard, tack-free coatings were formed. Thin disks of the cured material were submersed in a 0.3M solution of methane sulfonic acid in a 50:50 ethylene glycol:ethanol blend. Following 30 min. at 100° C., the formulation of EXAMPLE 2B was completely dissolved whereas the formulation of EXAMPLE 2A showed no evidence of dissolution even after 2 hrs. in the same solvent blend.

Example 3

The following table, (TABLE 2), discloses Examples prepared in accordance with the invention which were later reworked.

PMMA=Poly(methylmethacrylate)
MMA=Methyl methacrylate
EA=Ethyl acrylate
BuOH soln=1:1:1 ethylene glycol:xylene:.1-butanol
MC=Methylene chloride
MSA=Methanesulfonic
C=bis(Hydroxylpropyl acrylate)acetal

TABLE 2

| Composition | Exposure Time | Solvent |
|---|---|---|
| 1:1 PMMA:C | 30 sec | 0.3 M MSA in 1:1 MC:BuOH soln |
| 40:60 PMMA:C | 30 sec | 0.3 M MSA in 1:1 MC:BuOH soln |
| 45:55 PMMA:C | 30 sec | 0.3 M MSA in 1:1 MC:BuOH soln |
| 1:1 MMA:C | 30 sec | 0.3 M MSA in 1:1 MC:BuOH soln |
| 1:1:1 PMMA:C:MMA | 5 sec | 0.3 M MSA in 1:1 MC:BuOH soln |
| 1:1:1 PMMA:C:EA | 5 sec | 0.3 M MSA in 1:1 MC:BuOH soln |
| 2:2:1 C:MMA:PMMA | 5 sec | 0.3 M MSA in 1:1 MC:BuOH soln |
| 1:1 PMMA:B | 30 sec | 0.3 M MSA in 1:1 MC:BuOH soln |

These Examples were exposed for the specified time using a Fusion® UV curing unit equipped with a D bulb. Radiometer measurements indicated that the dose for a 30 sec exposure was approximately 30 J/cm². Following exposure to the indicated dose, all samples were subjected to the indicated solvent blend and heated to reflux. Complete dissolution of all compositions was observed within 30 minutes.

The above specification, examples and data provide a complete description of the manufacture and use of the composition of the invention. Since many embodiments of the invention can be made without departing from the spirit and scope of the invention, the invention resides in the claims hereinafter appended.

The claimed invention is:

1. An uncured thermosetting composition which is capable of curing upon exposure to actinic radiation, said composition comprising:

(a) an acetal diacrylate of the formula:

$$CH_2=CCOR_3-O\diagdown_{\substack{C \\ R_1 \ R_2}}\diagup O-R_4OCC=CH_2$$
$$\ \ \ \ |\ \ \ \ \ \ \ \ \ \ \ \ \ \ \ \ \ \ \ \ \ \ \ \ \ |$$
$$\ \ \ R_5\ \ \ \ \ \ \ \ \ \ \ \ \ \ \ \ \ \ \ \ \ R_6$$

wherein $R_1$ and $R_2$ are individually hydrogen, $C_{1-6}$ alkyl, aryl, or substituted aryl; $R_3$ and $R_4$ are individually $C_{1-6}$ alkyl, aryl, substituted alkyl, or aryl alkyl; and $R_5$ and $R_6$ are individually hydrogen or $C_{1-6}$ alkyl; and (b) a free radical curing agent.

2. The composition of claim 1, wherein $R_1$ and $R_2$ are individually linear or branched $C_{1-6}$ alkyl groups selected from the group consisting of methyl, ethyl, propyl, butyl, pentyl, and hexyl.

3. The composition of claim 1, wherein $R_1$ and $R_2$ are individually selected from the group consisting of hydrogen, methyl, ethyl, propyl, and mixtures thereof.

4. The composition of claim 1, wherein $R_3$ and $R_4$ are individually a linear or branched $C_{1-6}$ alkyl selected from the group consisting of methyl, ethyl, propyl, butyl, pentyl, hexyl and mixtures thereof.

5. The composition of claim 1, wherein $R_5$ and $R_6$ are individually a linear or branched $C_{1-6}$ alkyl selected from the group consisting of methyl, ethyl, propyl and mixtures thereof.

6. The composition of claim 1, wherein $R_1$ and $R_2$ are individually hydrogen, methyl, or mixtures thereof; $R_3$ and $R_4$ are ethyl; $R_5$ and $R_6$ are methyl.

7. The composition of claim 1, wherein said composition additionally comprises a second acrylic resin.

8. The composition of claim 7, wherein said second acrylic resin is selected from the group consisting of a monofunctional acrylic resin, a monofunctional methacrylic resin, and mixtures thereof.

9. The composition of claim 1, wherein said acetal diacrylate is present in a concentration ranging from about 95 wt % to 99.9 wt %.

10. The composition of claim 9, wherein said composition additionally comprises a second acrylic resin, the weight ratio of said acetal diacrylate to said second acrylic resin ranges from about 1:5 to 1:1.

11. The composition of claim 1, wherein said curing agent comprises an alkyl amino acetophone.

12. The composition of claim 11, wherein said initiator comprises a compound of the formula:

$$X\text{-}\underset{}{\bigcirc}\text{-}\overset{O}{\underset{\|}{C}}\text{-}\overset{R_7}{\underset{R_8}{C}}\text{-}R_9$$

and wherein X is hydrogen, ρ-OCH₃, ρ-SCH₃, ρ-N(CH₃)₂, ρ-N-morpholino, m-OCH₃, or ρ-OCH₃; $R_7$ is methyl or ethyl; $R_8$ is methyl or methyl benzyl; and $R_9$ is —N(CH₃)₂ or morpholino.

13. The composition of claim 12, wherein $R_7$ is ethyl, $R_8$ is methyl benzyl, and $R_9$ is morpholino.

14. The composition of claim 11 wherein said initiator is present in a concentration ranging from about 0.1 wt % to 5 wt %.

15. The composition of claim 1, additionally comprising an organic filler.

16. The composition of claim 15, wherein said organic filler is present in a concentration ranging from about 25 wt % to 70 wt %.

17. The composition of claim 16, wherein said organic filler is selected from the group consisting of a polyacrylate, a polymethacrylate, a polystyrene, a nylon, a polycarbonate, a polyvinyl alcohol, a polyester, a phenoxy resin, an ethylene-vinylacetate and mixtures thereof.

18. The composition of claim 16, wherein said organic filler comprises a polyacrylate.

19. The composition of claim 1, wherein composition has a Tg of from about 90° C. to 100° C.

20. A cured encapsulant resin comprising the reaction product of:
(a) an acetal diacrylate of the formula:

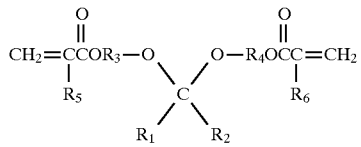

wherein $R_1$ and $R_2$ are individually hydrogen, $C_{1-6}$ alkyl, aryl, or substituted aryl; $R_3$ and $R_4$ are individually $C_{1-6}$ alkyl, aryl, substituted alkyl, or aryl alkyl; and $R_5$ and $R_6$ are individually hydrogen or $C_{1-6}$ alkyl; and (b) an organic filler
wherein said cured encapsulant resin is soluble in a dilute acid solution thereby allowing recovery after application.

21. The composition of claim 20, wherein $R_1$ and $R_2$ are individually linear or branched $C_{1-6}$ alkyl groups selected from the group consisting of methyl, ethyl, propyl, butyl, pentyl, and hexyl.

22. The composition of claim 20, wherein $R_1$ and $R_2$ are individually selected from the group consisting of hydrogen, methyl, ethyl, propyl, and mixtures thereof.

23. The composition of claim 20, wherein $R_3$ and $R_4$ are individually a linear or branched $C_{1-6}$ alkyl selected from the group consisting of methyl, ethyl, propyl, butyl, pentyl, hexyl and mixtures thereof.

24. The composition of claim 20, wherein $R_5$ and $R_6$ are individually a linear or branched $C_{1-6}$ alkyl selected from the group consisting of methyl, ethyl, propyl and mixtures thereof.

25. The composition of claim 20, wherein $R_1$ and $R_2$ are individually hydrogen, methyl, or mixtures thereof; $R_3$ and $R_4$ are ethyl; $R_5$ and $R_6$ are methyl.

26. The composition of claim 20, wherein said composition additionally comprises a second acrylic resin.

27. The composition of claim 26, wherein said second acrylic resin is selected from the group consisting of a monofunctional acrylic resin, a monofunctional methacrylic resin, and mixtures thereof.

28. The composition of claim 20, wherein said acetal diacrylate is present in a concentration ranging from about 25 wt % to 99.9 wt %.

29. The composition of claim 28, wherein said composition additionally comprises a second acrylic resin, the weight ratio of said acetal diacrylate to said second acrylic resin ranges from about 1:5 to 1:1.

30. The composition of claim 20, wherein said organic filler is present in a concentration ranging from about 25 wt % to 70 wt %.

31. The composition of claim 30, wherein said organic filler is selected from the group consisting of a polyacrylate, a polymethacrylate, a polystyrene, a nylon, a polycarbonate, a polyvinyl alcohol, a polyester, a phenoxyresin, an ethylene-vinylacetate and mixtures thereof.

32. The composition of claim 30, wherein said organic filler comprises a polyacrylate.

33. The composition of claim 20, wherein composition has a Tg of from about 90° C. to 100° C.

34. A method of recovering a cured thermosetting encapsulant resin comprising the reaction product of:
(a) an acetal diacrylate of the formula:

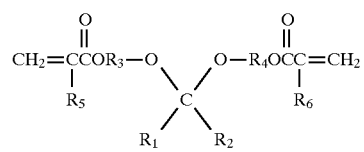

wherein $R_1$ and $R_2$ are individually hydrogen, $C_{1-6}$ alkyl, aryl, or substituted aryl; $R_3$ and $R_4$ are individually $C_{1-6}$ alkyl, aryl, substituted alkyl, or aryl alkyl; and $R_5$ and R6 are individually hydrogen or $C_{1-6}$ alkyl; and (b) a free radical curing agent;
wherein said cured encapsulant resin is soluble in a dilute acid solution thereby allowing recovery, said method comprising the steps of subjecting the encapsulant resin to an acidic solvent for a period of time adequate to substantially dissolve said resin.

35. The method of claim 34, wherein said acidic solvent comprises an acid source selected from the group consisting of acetic acid, methane sulfonic acid, trichloroacetic acid, trifluoroacetic acid, para-toluene sulfonic acid, and mixtures thereof.

36. The method of claim 34, wherein said acidic solvent has a temperature ranging from about 25° C. to 125° C.

37. The composition of claim 9, wherein said composition additionally comprises a second acrylic resin, the weight ratio of said acetal diacrylate to said second acrylic resin ranges from about 1:5 to 1:1.

38. The method of claim 34, wherein said acid solvent comprises about 0.3M of methane sulfonic acid, with 1-butanol, ethylene glycol, methylene chloride, and xylene, said 1-butanol, ethylene glycol and xylene present in a 1:1:1 wt % ratio.

* * * * *